Feb. 20, 1934.  E. F. HAGER  1,948,109
CUTTING DEVICE
Filed May 4, 1932  2 Sheets-Sheet 1
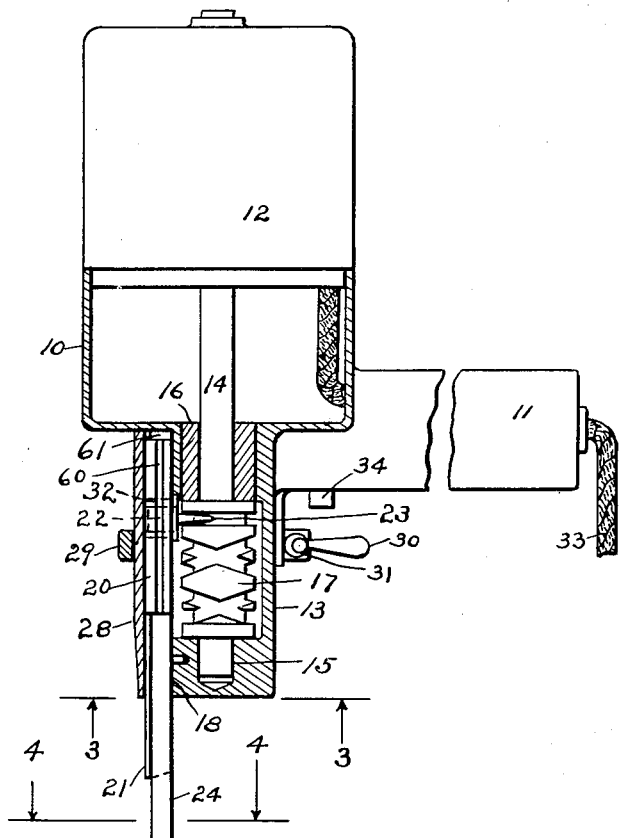
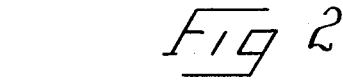
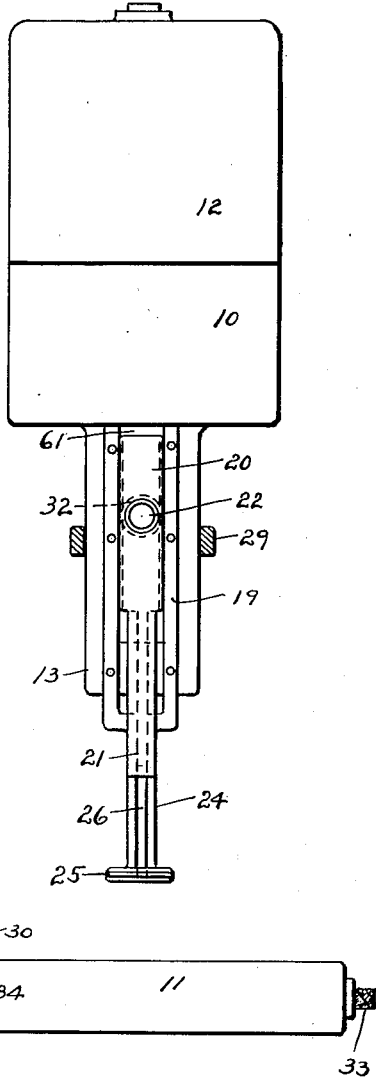
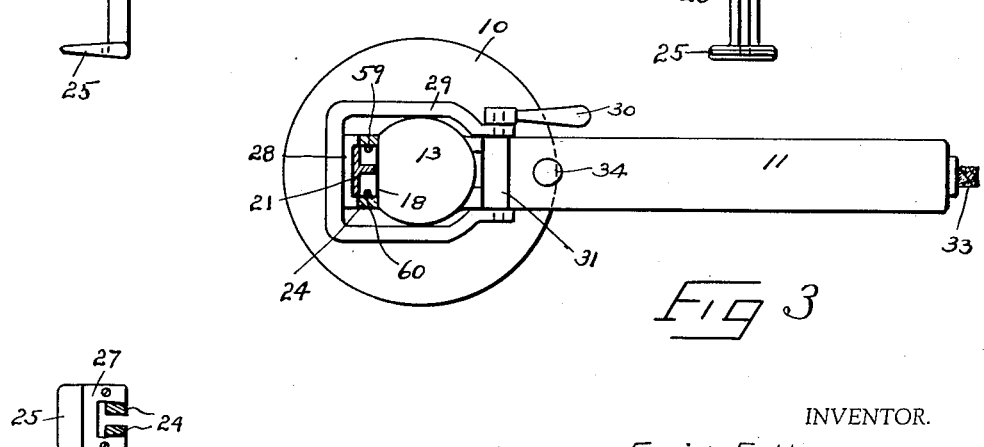
INVENTOR.
Emil F. Hager
BY
ATTORNEY.

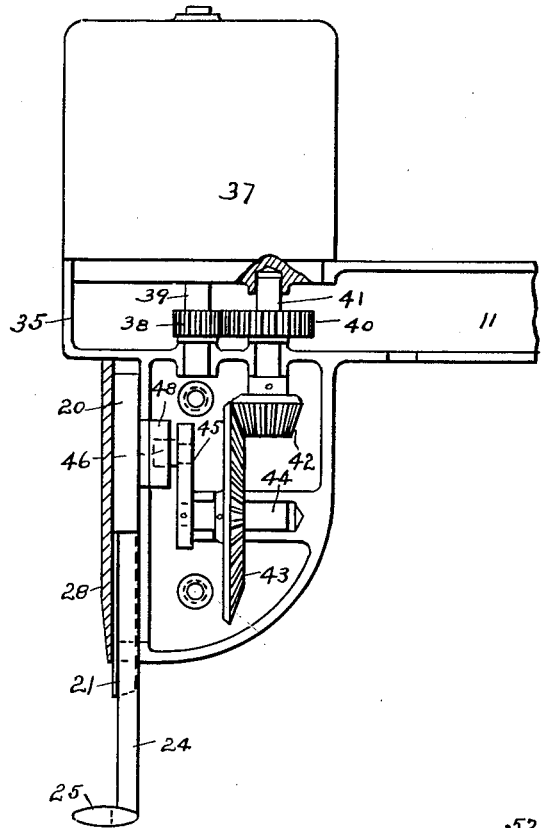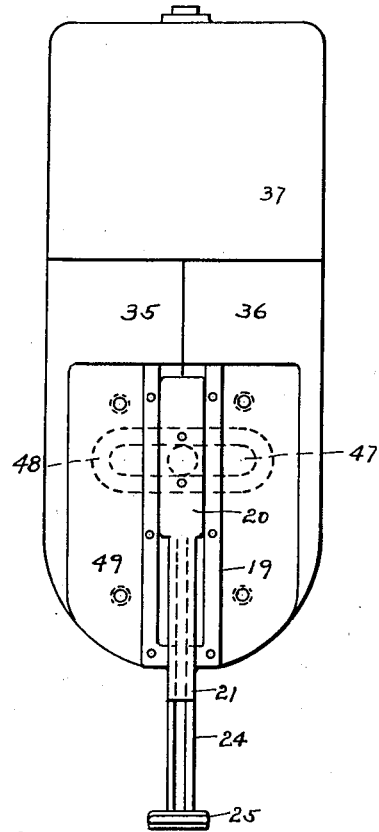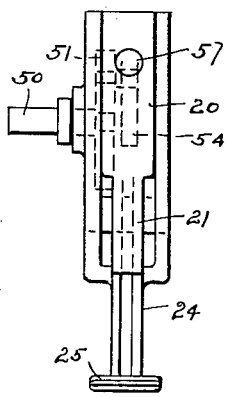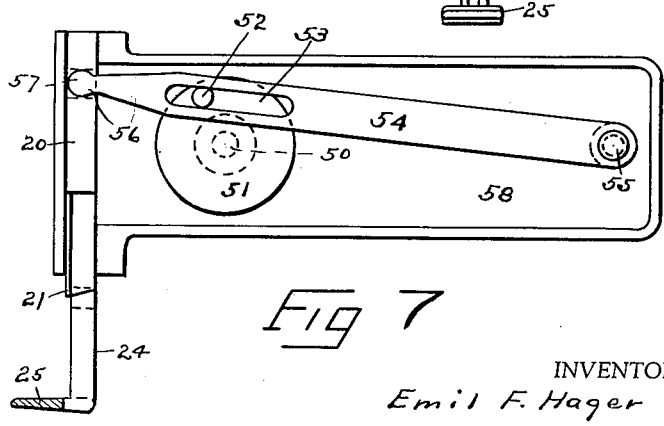

Patented Feb. 20, 1934

1,948,109

UNITED STATES PATENT OFFICE 1,948,109

CUTTING DEVICE

Emil F. Hager, Richmond Hill, N. Y.

Application May 4, 1932. Serial No. 609,153

7 Claims. (Cl. 128—317)

The invention relates to cutting devices and is particularly adapted for the removal of plaster casts, as used in surgery, on various parts of the human body. It has for its main object to provide a device of this nature which may be employed in the removal of such plaster casts from any part of the body without causing pain or inconvenience to the patient nor requiring unusual skill on the part of the operator. Another object is to so construct the device that it will neither distort nor destroy the cast when cutting it, thus permitting its further use if desired.

A further object is to provide a device of light weight, rugged and powerful construction, and which will perform its work at a high rate of speed. A still further object is to provide a device which has no parts easily broken or apt to get out of order, and on which such parts as require sharpening are readily accessible for removal and replacement, even while the device is in use.

These and various other objects and advantages will be readily understood from the following description and from the accompanying drawings of preferred embodiments of the invention in which, however, modifications may be made without departing from the scope of the appended claims.

In the drawings

Fig. 1 is a side elevation of a preferred embodiment of the invention, shown partly in cross section;

Fig. 2 is a front elevation of same with certain parts removed;

Fig. 3 is a bottom view of Fig. 1 taken on line 3—3;

Fig. 4 is a top view of Fig. 1 taken on line 4—4;

Fig. 5 is a side elevation of another embodiment of the invention, shown partly in cross section and with certain parts removed;

Fig. 6 is a front elevation of Fig. 5, shown with certain parts removed;

Fig. 7 is a side elevation of still another embodiment, shown with the side plate removed; and Fig. 8 is a front elevation of Fig. 7, shown with certain parts removed.

Referring first to Figs. 1 to 4, the device consists of a body member 10 which is provided with an operating handle 11 and in the upper end of which an electric motor 12 is mounted. The lower end of the body member is provided with a substantially circular extension 13. The motor shaft 14 extends into this projection where it is supported in a lower bearing 15 and a bushing 16 which is inserted in the upper end of the projection. A worm 17 is rigidly mounted on the motor shaft. It is provided with both a right handed and a left handed thread which run into each other at each end of the worm so as to form what may be termed a continuous thread.

A flat face 18 is provided on the front side of the extension 13 and on this face a U shaped guide 19 is secured. A punch holder 20, having a T shaped punch 21 at its lower end, is slidingly mounted in the U shaped guide. It is actuated by a stud 22 which has a semi-circular projection 23 which engages in the threads of the worm 17. The lower part of the guide 19 is provided with a bifurcated leg 24 which terminates in a foot 25. The rearwardly extending part of the punch 21 slides in the slot 26 formed in the leg 24, while the end of the punch engages in a die plate 27 secured on the foot 25. A plate 28 is clamped against the front of the guide 19 by a clamp 29. This clamp is actuated by a handle 30 which turns an eccentric roller 31. To minimize wear a hardened bushing 32 is inserted in the punch holder, and in this bushing the stud 22 engages. The electric conductor 33 passes through the operating handle and an electric switch button 34 is mounted on the handle to facilitate the starting and stopping of the motor.

Referring now to Figs. 5 and 6. In this instance the body member is formed of two parts 35 and 36 which are symmetrical halves. The motor 37 is mounted on top as in the former instance, however, instead of using a worm, a train of gears is employed. A pinion 38 is secured on the motor shaft 39. This pinion drives the gear 40 which is secured on a jack shaft 41 on the other end of which a bevel pinion 42 is mounted. The bevel pinion in turn drives a bevel gear 43 which is mounted on a shaft 44. The other end of this shaft carries a crank 45, the stud 46 of which engages in a transverse slot 47 formed in a cross member 48 which is pinned on the rear of the punch holder 20. As in the device previously described, the punch holder slides in the guide 19. The front plate 28 is screwed to the front face 49 of the body member. All other parts are numbered as in Figs. 1 to 4.

In Figs. 7 and 8 the motor is dispensed with and the punch is operated from any source of power by a flexible shaft connected to the driving shaft 50. This shaft drives a disc 51 on which a stud 52 is eccentrically located. The stud engages in a slot 53 formed in a long lever 54, which is fulcrumed at 55 and provided with a spherical end 56 which engages in a hole 57 in the punch holder 20. The body member 58 in this instance forms the handle of the device. The other parts are similar to those already described.

The device operates in the following manner. The foot 25 is inserted under one edge of a plaster cast and the motor is started. The reciprocation of the punch cuts a slot through the plaster cast of a width equal to the width of the punch. The stroke of the punch is such that its cutting edge does not pass through the foot, 25, thus eliminating all danger of injury to the patient. As the width of the punch is slightly greater than the width of the leg 24, this leg will pass freely through the slot as it is cut.

As considerable plaster dust is formed during the cutting, means are provided for blowing this dust away from the punch holder so that it will not enter the device. These means consist of two narrow grooves 59 and 60 cut in the sides of the punch holder 20. As air is confined within the space 61 above the punch holder, the punch will cause some of this air to be forcibly ejected through the grooves each time the punch makes an upward movement, thus blowing away any dust which might otherwise enter the device.

The use of the clamp 29 greatly facilitates the removal of the punch and punch holder. The handle 30 is turned, the clamp is withdrawn from the extension 13, and the front plate 28 is removed, after which the punch holder may be readily withdrawn from the guide 19.

While I have described and illustrated the devices as particularly useful for the removal of plaster casts, I do not wish to confine their use strictly to this field, but may employ them for any other purposes where their usefulness would be evident.

Having described my invention and its operation, what I claim as new and wish to protect by Letters Patent is:

1. In a cutting device of the class described, a body member having an operating handle, a guide associated with said body member, a leg projecting from said guide and terminating in a foot insertable under the material to be cut, a punch reciprocatingly mounted in said guide, said foot containing a die opening with which the punch coacts during its reciprocations, the punch being of sufficient width to form a slot in the material being cut of greater width than the width of the leg so as to permit the said leg to pass therethrough, and means for imparting reciprocating motion to said punch.

2. In a cutting device of the class described, a body member having an operating handle, a guide associated with said body member, a bifurcated leg projecting from said guide and terminating in a foot insertable under the material to be cut, a punch reciprocatingly mounted in said guide and said bifurcated leg, said foot containing a die opening with which the punch coacts during its reciprocations, the punch being of sufficient width to form a slot in the material being cut of greater width than the width of the leg so as to permit the said leg to pass therethrough, and means for imparting a reciprocating motion to said punch.

3. In a cutting device of the class described, a body member having an operating handle, a guide associated with said body member, a bifurcated leg projecting from said guide and terminating in a foot insertable under the material to be cut, a removable punch reciprocatingly mounted in said guide and said bifurcated leg, said foot containing a die opening with which the punch coacts during its reciprocations, the punch being of sufficient width to form a slot in the material being cut of greater width than the width of the leg so as to permit the said leg to pass therethrough, a removable die plate mounted upon the foot, and means for imparting reciprocating motion to said punch.

4. In a cutting device of the class described, a body member having an operating handle, an electric motor mounted on said body member, a guide secured on the body member, a leg projecting from said guide and terminating in a foot insertable under the material to be cut, a punch reciprocatingly mounted in said guide, said foot containing a die opening with which the punch coacts during its reciprocations, the punch being of sufficient width to form a slot in the material being cut of greater width than the width of the leg so as to permit the said leg to pass therethrough, and means for converting the rotary motion of the motor to reciprocating motion and for imparting this reciprocating motion to the punch.

5. In a cutting device of the class described, a body member having an operating handle, an electric motor mounted on said body member, a guide secured on the body member, a bifurcated leg projecting from said guide and terminating in a foot insertable under the material to be cut, a punch reciprocatingly mounted in said guide and bifurcated leg, said foot containing a die opening with which the punch coacts during its reciprocations, the punch being of sufficient width to form a slot in the material being cut of greater width than the width of the leg so as to permit the leg to pass therethrough, and speed reducing means for converting the rotary motion of the motor to reciprocating motion and for imparting this speed-reduced reciprocating motion to the punch.

6. In a cutting device of the class described, a body member having an operating handle, an electric motor mounted on said body member, a guide secured on the body member, a bifurcated leg projecting from said guide and terminating in a foot insertable under the material to be cut, a removable punch reciprocatingly mounted in said guide and bifurcated leg above the foot and contacting therewith during the stroke, the punch being of sufficient width to form a slot in the material being cut to permit the leg to pass therethrough, a removable clamp for securing said punch in the guide and leg, and means for converting the rotary motion of the motor to reciprocating motion and for imparting this reciprocating motion to the punch.

7. In a cutting machine of the class described, a body member having an operating handle, an electric motor mounted on said body member, a guide secured on the body member, a leg projecting from said guide and terminating in a foot insertable under the material to be cut, a punch reciprocatingly mounted in said guide above the foot and contacting therewith during the stroke, the punch being of sufficient width to form a slot in the material being cut to permit the leg to pass therethrough, means associated with the puch and guide for ejecting jets of air to prevent dust from entering the interior of the device, and means for converting the rotary motion of the motor to reciprocating motion and for imparting this reciprocating motion to the punch.

EMIL F. HAGER.